US009843912B2

(12) United States Patent
Shaw

(10) Patent No.: US 9,843,912 B2
(45) Date of Patent: Dec. 12, 2017

(54) MACHINE-TO-MACHINE (M2M) AUTONOMOUS MEDIA DELIVERY

(71) Applicant: AT&T Intellectual Property I, LP, Atlanta, GA (US)

(72) Inventor: Venson Shaw, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 208 days.

(21) Appl. No.: 14/527,979

(22) Filed: Oct. 30, 2014

(65) Prior Publication Data

US 2016/0127457 A1 May 5, 2016

(51) Int. Cl.
*G06F 15/16* (2006.01)
*H04W 4/22* (2009.01)
*H04W 4/00* (2009.01)
*H04W 4/02* (2009.01)

(52) U.S. Cl.
CPC .............. *H04W 4/22* (2013.01); *H04W 4/005* (2013.01); *H04W 4/02* (2013.01)

(58) Field of Classification Search
CPC ......... H04W 4/22; H04W 4/02; H04W 4/005; H04W 4/06; H04W 4/027; H04W 4/021
See application file for complete search history.

(56) References Cited

U.S. PATENT DOCUMENTS

| | | | |
|---|---|---|---|
| 8,295,957 B2 | 10/2012 | Holzberg et al. | |
| 8,412,231 B1* | 4/2013 | White | H04W 4/021 340/988 |
| 8,589,476 B2 | 11/2013 | Siegel et al. | |
| 9,380,332 B1* | 6/2016 | Mills | H04N 21/43 |
| 9,606,993 B2* | 3/2017 | Kaila | G06F 17/30053 |
| 2007/0073904 A1* | 3/2007 | Leung | H04N 21/4345 709/247 |
| 2008/0139112 A1 | 6/2008 | Sampath et al. | |
| 2008/0168391 A1* | 7/2008 | Robbin | G06F 17/30194 715/810 |
| 2009/0164653 A1* | 6/2009 | Mandyam | H04L 65/601 709/231 |
| 2010/0277315 A1 | 11/2010 | Cohn et al. | |
| 2011/0035033 A1 | 2/2011 | Friedenberger | |
| 2011/0210846 A1* | 9/2011 | Causey | G08B 25/002 340/539.17 |
| 2011/0302317 A1 | 12/2011 | Chen et al. | |
| 2013/0065559 A1 | 3/2013 | Chen et al. | |
| 2013/0219023 A1* | 8/2013 | Surianarayanan | H04W 4/22 709/219 |
| 2014/0007010 A1* | 1/2014 | Blom | G06F 3/011 715/825 |

(Continued)

*Primary Examiner* — Shean Tokuta
(74) *Attorney, Agent, or Firm* — Baker & Hostetler LLP

(57) ABSTRACT

Systems, methods, and apparatuses may use machine-to-machine communication to provide customized media in response to an autonomous detection of an event, such as a celebration, emergency, or security event. A method may include receiving a request in response to an autonomous detection of an event, whereby the request includes information about the event. Media appropriate for the event may be determined based on the information about the event. The media appropriate for the event may be further adapted according to information on a destination device and users of the destination device. Instructions are then provided to deliver the media appropriate for the event to the destination device.

14 Claims, 8 Drawing Sheets

(56) References Cited

U.S. PATENT DOCUMENTS

| | | | |
|---|---|---|---|
| 2014/0055612 A1* | 2/2014 | Hinkel | G08B 13/19656 348/143 |
| 2014/0062697 A1 | 3/2014 | Ramaswamy et al. | |
| 2014/0121794 A1 | 5/2014 | Eronen et al. | |
| 2014/0253326 A1* | 9/2014 | Cho | H04W 4/22 340/539.13 |
| 2014/0330776 A1* | 11/2014 | Chen | G06F 17/30176 707/610 |
| 2014/0379850 A1* | 12/2014 | Peterson | H04L 67/02 709/217 |
| 2015/0039601 A1* | 2/2015 | Harrang | G06F 17/30867 707/727 |
| 2015/0111490 A1* | 4/2015 | Iwai | H04W 4/06 455/3.01 |
| 2015/0133049 A1* | 5/2015 | Lee | H04W 4/003 455/41.1 |
| 2015/0311991 A1* | 10/2015 | Iwai | H04M 11/08 455/414.2 |

* cited by examiner

MACHINE-TO-MACHINE (M2M) AUTONOMOUS MEDIA DELIVERY

TECHNICAL FIELD

The technical field generally relates to wired or wireless communications and more specifically to machine-to-machine communication.

BACKGROUND

Machine-to-machine (M2M) refers to technologies that allow both wireless and wired systems to communicate with other devices. An M2M system may occur in an industrial setting, such as when a M2M device on a machine monitors the level of wear on a component of the machine and autonomously communicates the status information over a network to a computer system. The computer system operator may then decide to order maintenance on the machine. An M2M system may also be used in a residential setting. For example, a home gas meter may include a device that relays information on the amount of gas consumed or whether the meter has been tampered with to a computer at the gas company office.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

As an example, an apparatus may have instructions that effectuate the operations of, responsive to an autonomous detection of an event, receiving a request. The request may include event information associated with the event. In addition, the instructions may comprise determining a media appropriate for the event based on the request and providing instructions to deliver the media appropriate for the event to a destination device.

In another example, a method may include, responsive to an autonomous detection of an event, receiving a request by a server. The request may include event information associated with the event. The method may additionally include determining, by the server, a media appropriate for the event based on the request. The method may also include providing, by the server, instructions to deliver the media appropriate for the event to a destination device.

In yet another example, a system may include a first device and a second device communicatively connected with the first device. The second device may comprise a processor and memory coupled to the processor. The memory may have executable instructions stored thereon that when executed by the processor cause the processor to effectuate operations. The operations may include, responsive to an autonomous detection of an event, receiving a request. The request may include event information associated with the event. The operations may additionally include determining a media appropriate for the event based on the request. The operations may also include providing instructions to deliver the media appropriate for the event to the first device.

BRIEF DESCRIPTION OF THE DRAWINGS

The following detailed description is better understood when read in conjunction with the appended drawings. For the purposes of illustration, examples are shown in the drawings; however, the subject matter is not limited to the specific elements and instrumentalities disclosed. In the drawings.

DETAILED DESCRIPTION

Disclosed herein are methods, systems, and devices for the autonomous delivery of media using machine-to-machine communications. An event, such as an emergency, celebration, or security event, may be autonomously detected. After an event is detected, a request may be sent to a server for media appropriate to that event so that the media may be sent to a destination device at a destination location, such as a home. When the server receives the request for media, the server determines an appropriate media (e.g., in terms of media type, format, quality, and content) for that event based on the request for media. For instance, if the event was a security break-in, the server may determine an appropriate media to send to a destination device at the destination location that will scare away the intruder. After the server determines an appropriate media, the server may then adapt the media according to the event, the destination device, or the users of the destination device. For example, if the destination device is only capable of playing low-resolution video, the server may adapt a video media to a low-resolution version. After the media is adapted, the media is delivered to the destination device at the destination location, where it may then be utilized by the destination device.

Figure 1:
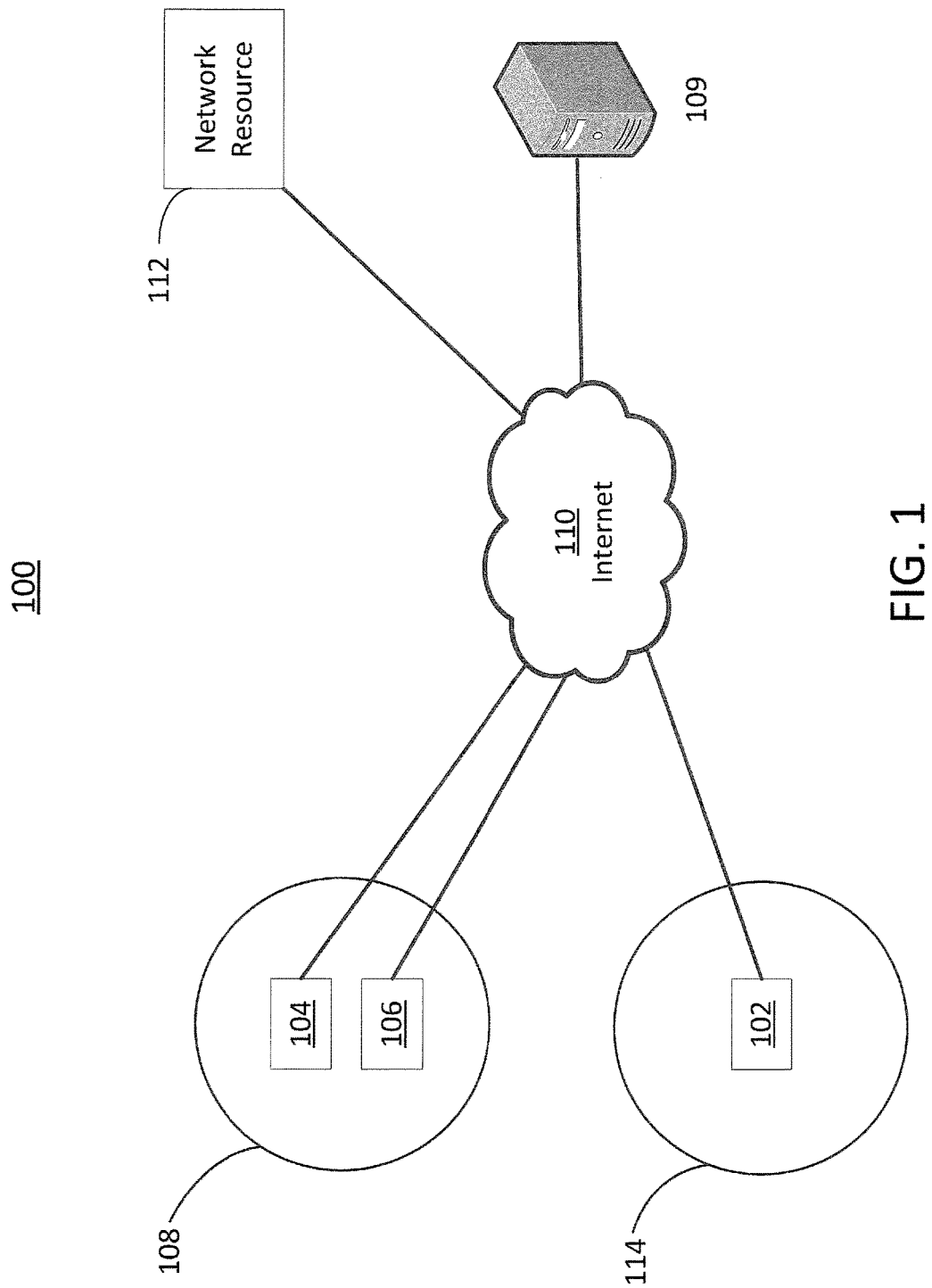
FIG. 1 illustrates an exemplary communications system in which one or more disclosed examples may be implemented.

FIG. 1 illustrates a communications system 100 in which one or more disclosed examples may be implemented. The communications system 100 may be a multiple access system that provides content, such as voice, data, video, messaging, broadcast, etc., to multiple wireline or wireless devices. The communications system 100 may enable multiple devices to access such content through the sharing of system resources, including wireless bandwidth.

As shown in FIG. 1, the communications system 100 may include a detecting device 102, a detecting device 104, a destination device 106, a server 109, an Internet 110, and a network resource 112. The disclosed examples contemplate any number of detecting devices 102, detecting devices 104, destination devices 106, servers 109, networks, network elements, or network resources 112. Internet 110 may be communicatively connected to one or more detecting devices 104 at a destination location 108, one or more destination devices 106 located at a destination location 108, and one or more detecting devices 102 at a secondary location 114. A destination location 108 is an area or location at which the media will be delivered. A secondary location 114 is any area or location other than the destination location 108. The disclosed examples contemplate any number of secondary locations 114 or destination locations 108. Furthermore, it should be appreciated that although FIG. 1 depicts a detecting device 104 and a destination device 106 as distinct elements, they may be comprised of a single device. In other words, a single device may function as both the device that detects an event and the device that utilizes the resulting media for the event.

A server 109 may be communicatively connected with the Internet 110 and, by extension, a detecting device 102, a detecting device 104, a destination device 106, and a network resource 112. A server 109 may include any type of computing device, such as a general-use server. An exemplary server 109 may include a mainframe computer, a computer with a reduced instruction set computing (RISC) architecture, a computer with a complex instruction set computing (CISC) architecture, and/or a computer running a Unix (e.g. Advanced Interactive eXecutive (AIX), Berkeley Software Distribution (BSD), Solaris, Linux, Hewlett-Packard UniX (HP-UX)), Windows, or OS/390 operating system.

A network resource 112 may be communicatively connected with the Internet 110 and, by extension, a detecting device 102, a detecting device 104, a destination device 106, and a server 109. A network resource 112 may include a second server, a detecting device, a destination device, a storage system, a database system, a software application or system, or any other resource which may communicate with the other elements of the communications system 100.

The communication connection between the Internet 110 and a detecting device 102, a detecting device 104, a destination device 106, a server 109, and a network resource 112 may comprise a wireless connection (such as a cellular network or a WiFi network), a wireline connection (such as an ethernet network or a fiber-optic network), or a combination thereof.

A detecting device 102, detecting device 104, or destination device 106 may include a mobile device (e.g., cellular phone, smart phone, or tablet), a consumer electronic device (e.g., television, stereo sound system, video player, or gaming device), a personal computing device (e.g., desktop computer, laptop, tablet, or handheld gaming device), an appliance (e.g., fridge or microwave), a public address system, an intercom system, a smoke detector, a camera, a garage door opener, a light switch, a thermostat, or a door lock, among other things. A detecting device 102, detecting device 104, or destination device 106 may also include a sensor such as a motion detector, a sound sensor, or a heat sensor. Also contemplated is a personal health sensor, such as a blood pressure monitor, heart rate monitor, or breath rate monitor. A detecting device 102, detecting device 104, or destination device 106 may also include a device combining the aforementioned types of device or a control unit coupled with one or more aforementioned types of device. For example, a security system may include a control unit, cameras, motion detectors, and speakers. As another example, an entertainment system may include a control unit, a television, a stereo sound system, speakers, and a video player. As a further example, a home control system may include a control unit, light switches, door locks, motion detectors, a thermostat, and an intercom.

Figure 2:
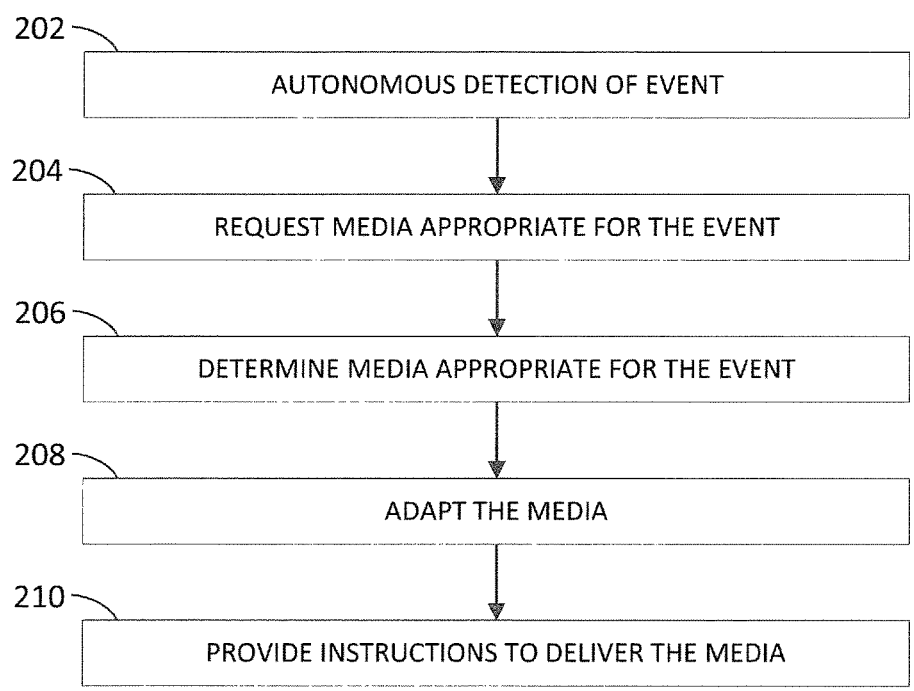
FIG. 2 illustrates an exemplary method for machine-to-machine autonomous media delivery.

FIG. 2 illustrates an exemplary method 200 for machine-to-machine autonomous media delivery.

At block 202, an event may be autonomously (e.g., automatically) detected. An autonomous detection is defined as a detection that takes place without substantial human intervention at the time of detection. For example, the detecting device 104 may communicate with the server 109 without human intervention. Human intervention may occur during the initial setup of the detecting device 104, such as powering on the detecting device 104 or configuring a profile for the server 109.

In an example, an event may include a celebration event. A celebration event may refer to a scheduled timeframe in which something may be celebrated, such as a date of a birthday, anniversary, holiday, or graduation or the timeframe of a wedding ceremony. A celebration event may also refer to an actual act of celebration, such as a party, gathering, or meal. In another example, an event may include an emergency event, such as a fire, earthquake, or flood. In yet another example, an event may include a security event, such as an intruder entering or attempting to enter a residence.

An event may be detected in a variety of ways. In an example, an event may be detected by detecting device 104 at destination location 108 or by detecting device 102 at secondary location 114. It should be noted that detecting device 102 and detecting device 104 both operate in a similar manner and that, unless indicated otherwise, a detecting device 102 may be interchanged with a detecting device 104 referenced in the examples and illustrations herein and vice versa. A detecting device 104 may detect an event through the live-sensing of conditions in a location. For example, a detecting device 104, using motion detectors and sound sensors, may detect an intruder attempting to enter a residence. As another example, a detecting device 104 may detect a party presently occurring through a sound sensor recognizing a large number of voices and a heat sensor recognizing a rise in temperature in the room. As yet another example, a detecting device 104 may detect a fire burning at a building using a heat sensor and smoke detector. As another example, a detecting device 104 may detect an earthquake using a seismometer sensor.

A detecting device 104 may also detect an event by way of a calendar or scheduling system. In an example, a detecting device 104 such as a desktop computer, tablet, or smartphone may include a calendar or scheduling system. An event may be stored within the calendar or scheduling system on the detecting device 104. As an illustration, a wedding anniversary, a birthday, a graduation, or a holiday may be stored in a calendar or scheduling system. When the date of the event occurs, the detecting device 104 may detect the event.

A detecting device 104 may also detect an event by monitoring a feed of information from a network resource 112, such as an internet news feed (e.g., Rich Site Summary (RSS)). As the detecting device 104 monitors the feed of information, the detecting device 104 may recognize an event embodied in the feed of information that is relevant to the users at the destination location 108 and thus detect the event. For example, a detecting device 104, such as a desktop computer, tablet, or smartphone, may monitor an internet news feed relating to emergency events and published by a network resource 112, such as a news network or government emergency agency. If a large-scale fire occurs in the vicinity of a destination location 108, information on the fire, such as the geographical location of the fire and its intensity, may be included in the internet news feed. The detecting device 104 may detect this event by recognizing that the geographical location of the fire described in the internet news feed encompasses the destination location 108 and the intensity is of a sufficient level to warrant a request for media.

It should be appreciated that instead of a detection being performed by a detecting device 104 at a destination location 108, a detection may be performed by a detecting device 102 at a secondary location 114. An event may be detected by a detecting device 102 at an office building (the secondary location 114) and the destination location 108 for the media delivery may be a residence. For example, a desktop computer at a person's office building may detect a birthday event on the desktop computer's calendar system, but the media will eventually be delivered to a destination device 106 at the person's residence. As another example, if there is an earthquake in an area encompassing a destination location 108, such as a home, and a secondary location 114, such as a government earthquake detection center, a detecting device 102, such as a seismometer, may detect the earthquake event at the government earthquake detection center instead of a detecting device 104 at the home.

It should also be appreciated that a detection of an event at a first location may be performed by a detecting device at a second location based on information from or the status of one or more detecting devices at the first location. To illustrate, the detecting device 104 at a first location, such as destination location 108, may comprise a variety of sensors which are communicatively connected to a detecting device 102 at a second location, such as secondary location 114. The sensors of the detecting device 104 at the destination location 108 provide sensor data (e.g., heat sensors provide a temperature, volume sensors provide a decibel level) to the detecting device 102 at the secondary location 114. The detecting device 102 at the secondary location 114 analyzes the sensor data and may make a determination that an event at the destination location 108 has occurred based on the sensor data. In another instance, a detecting device 102 at a secondary location 114 may aggregate sensor data from the detecting device 102 at the secondary location 114 with sensor data from a detecting device 104 at a destination location 108. For example, data from a seismometer sensor in a detecting device 104 at a destination location 108 may be aggregated in a monitoring station at a secondary location 114 with seismometer data from a detecting device 102 in the monitoring station to determine that an earthquake event has occurred.

At block 204, a request (e.g., a message) is sent to a server 109 in response to the autonomous detection of an event. The request may include a request for media. As used in the present disclosure, the term media encompasses any format of data useful for communicating information. As examples, media may be a digital video file, a digital audio file, a digital text file, or a combination thereof. Media may also include a set of data to be used with an application on the destination device 106 at the destination location 108. For example, media may include data to be used in an augmented reality application. A media may include several aspects, such as media type, media format, media quality, and media content. Media type may refer to the form that a media takes, such as video, audio, still image, text, or a data type for a particular application such as an augmented reality application. It should be noted that a media may include more than one media type, for example in the case of a media including both video and audio. A media format may refer to a digital format that a particular media type may take. For example, a video media may be in MPEG-4 Part 14 (MP4) format, Audio Video Interleave (AVI) format, or Windows Media Video (WMV) format. As another example, a still image media may be in Graphics Interchange Format (GIF), Joint Photographic Experts Group (JPEG) format, or bitmap (BMP) format. Media quality may refer to a qualitative aspect of a media, such as the bit rate of an audio media file or the resolution of a video or image file. Media content may refer to the informational content of a media. To illustrate, an audio media and a text media may include the same content: the audio media may include an auditory statement and the text media may include the same statement but in text form.

The request for media may be made by a detecting device 104 at a destination location 108 or by a detecting device 102 at a secondary location 114. As an example, the request for media may be made by a security system (a detecting device 104) at a home (a destination location 108), wherein the requested media is to be delivered to the security system or other device at the home. In another example, such as when an earthquake is detected by a seismometer detecting device 102 at a remote seismology center (a secondary location 114), the seismometer detecting device 102 may request for media to be delivered to a destination device 106 at the destination location 108.

The request may be transmitted over a wireless cellular network, the Internet 110, an intranet, a local area network, any other communication network, or a combination thereof. It should be noted that communication over the Internet 110, an intranet, a local area network, or any other medium is not limited to wired communication, but may also be comprised of wireless communication, such as WiFi.

The request may include information describing the detected event (hereinafter event information), information on the destination device 106 at the destination location 108 which is to eventually receive the media (hereinafter device information), and information associated with one or more individuals contemplated as users of the destination device 106 (hereinafter user information).

Event information associated with a detected event may include information for the server 109 to adequately determine an appropriate media for the event. Event information may include a type of event, a severity level of the event, and any other details relating to that event. As an example, if an earthquake event is detected, the event information may include that the event was an earthquake, the Richter scale value, the location of the epicenter, the location of the detecting device 104, and the time of the earthquake. As another example, if a detected event is a break-in of a home (hereinafter home break-in event), the event information may include information that a break-in occurred, the location of the home, the time of the break-in, the nature of the break-in (e.g., forcing open a door or breaking a window), and the location of the break-in within the home (e.g., garage, main entrance foyer, or master bedroom). The event information for a home break-in event may also include media, such as picture, video, or audio, from one or more detecting devices 104.

In addition to event information, a request may also include device information about a destination device 106 that will receive the requested media. The device information may later be used to determine a media appropriate for the event, adapt the media to the destination device 106, and direct where the media should be delivered. Device information may include a device type, a device maker or brand, a device model number, name, or other identifier, a device operating system, an attribute indicating the capabilities of a device, an attribute indicating a set of preferences associated with a device, or any combination thereof. A device type may describe any device capable of receiving media, such as a video display, a stereo, a security system, a personal computer, or any other device described herein. As examples of an attribute indicating the capabilities of a device, device information may indicate a storage capacity of a device, whether a device is capable of playing a video media type, the video formats the device can play, the video resolutions the device can play, whether a device is capable of displaying subtitles with a video, whether a device is capable of playing an audio media type, the audio formats the device can play, whether a device can display a text media type, the text file formats the device can display, or the applications on the device, including any augmented reality applications. Device information indicating a set of preferences associated with a device may encompass the same variables as device information indicating device capability but instead reflects a preferred subset of the capabilities. For example, a device may be capable of displaying both high-definition and standard-definition video, but the device information may indicate a preference that the device receives standard-definition video in order to save on bandwidth. Device information may also include an address or identifier of a device, such as a network IP address or mobile phone number.

Event information may also include user information, which is information relating to a person that might be a user of the destination device 106 that receives the media. User information may include a preference of the user or some other attribute that would bear on the type, format, quality, or content of the media. For example, a user may be hearing-impaired and would prefer text media or video media with subtitles instead of or in addition to audio media. As another example, a destination device 106 may have multiple applications capable of playing the received media, but a user's preference may dictate that the media be played by one application instead of the others.

At block 206, a media appropriate for the detected event is determined in response to the request for media. The process of determining a media appropriate for the event may involve considerations of media type, format, quality, and content. The determination may occur on the server 109. The server 109 may determine the appropriate media based on information contained in the request, such as event information, device information, or user information. The server 109 may also base the determination on information stored on the server 109 or retrieved from a network resource 112. For example, the server 109 or a network resource 112 may have information on a building's layout, which the server 109 may use in determining a media for an event occurring at that building.

In one example, a fire within a building may be detected and a request for appropriate media is made. Event information in the media request for the fire event may include an identification of the event as a fire, information that the fire is at a particular office building, information that the fire is of a high intensity, information that there is a large amount of smoke, and information that the fire is in a particular kitchen on the first floor. Device information may include information identifying a destination device 106 at the destination location 108 as a public address system capable of playing an audio media file, an LCD video screen capable of playing audio and displaying subtitle text in addition to the video, or a mobile phone with an augmented reality application. User information may include information that an office worker in the building is hearing impaired.

The server 109 may determine several media files, based on event information, device information, and user information. Since the fire is of a high intensity and there is a large amount of smoke, the server 109 may determine an audio media file to be played on the public address device at the office building. The audio media file may contain contents that instruct occupants to leave the building—perhaps while staying close to the ground due to the large amount of smoke—by a particular route so that the location of the fire, the first floor kitchen, is avoided.

Similarly, the server 109 may determine a video media file to be played on LCD video screens in the office building, the contents of which display a map of the building and a suggested evacuation route, avoiding the fire in the first-floor kitchen. The video media file may also include audio evacuation instructions. But since the user information indicates that an individual with a hearing impairment works in the building, the video media file may also include subtitles of the audio instructions. This example illustrates how the server 109 may determine a media based both on information in the request and information stored on the server 109 (e.g., the layout of the building). This example also illustrates that a media file may include aspects of multiple types of media, such as video, audio, and text.

The server 109 may also determine a media file containing augmented reality data that will be used by a destination device 106, such as a mobile phone, with an augmented reality application. An augmented reality application is an application in which a live or near-live perception of a real-world environment is augmented by computer-generated sound, video, graphics, or other data representations. Based on the office building layout stored on the server 109 or retrieved from a network resource 112 and the information in the media request, the server 109 may determine an augmented reality media file that contains data representing a safe path out of the office building. In an example, the augmented reality application on the mobile phone overlays a path indicator, such as an arrow, over a real-time display of an image from a mobile phone's camera. A user may hold the mobile phone up as he or she walks through a location and follows the arrow indicating whether to walk forward, turn a corner, or turn around. The augmented reality application may also show a warning picture or symbol overlaid on a portion of the real-time display. For example, if a user is at a location with a choice of doors or pathways, the augmented reality application may display a universal danger symbol over one of the doors or pathways that would lead towards a dangerous area. In the instant example, the server 109 may determine an augmented reality media file, the contents of which are indicative of a safe path out of the office building based on the event information in the media request and the layout of the office building stored on the server 109. The augmented reality media file may then be used by the augmented reality application on a mobile phone at the office building.

In another example, a children's birthday party event may be detected and a request for media may be made in response. Event information in the request may include information identifying the event type as a children's birthday party, information that the party is taking place at the present time, and information that the party is taking place in the living room of the home. Device information may include information identifying the destination device 106 as a stereo sound system capable of playing MP3 audio media files at a bit rate in the range of 32 to 256 Kbit/s. User information in this example may include an attribute identifying the users as children and another attribute indicating a preference for lower bit rate files in order to reduce bandwidth usage. Based on this information, the server 109 may determine one or more audio type birthday songs that are appropriate for children, in MP3 format, and with a bit rate of 32 Kbit/s.

In yet another example, a break-in of a home by an intruder may be detected and a request for media may be made in response. The request for media may include event information, such as an identification that the event is a home break-in, the location of the home, the time of the break-in, that the break-in occurred in the first floor living room, and that the break-in was via a broken window. The request for media may also include media from the detecting device 104, such as a video, an image, or audio of the intruder. The device information included in the media request may indicate that a destination device 106 at the home includes a loudspeaker system, capable of playing audio media files. Based on this information, the server 109 may determine an audio media file. In one aspect, the audio media file may include an audio media file whose contents are intended to emulate the sound of someone in the house hearing the break-in. Since the event information indicated that the break-in occurred in the first floor living room, the determined audio media file may include the sound of a voice saying "I heard something in our living room. I'm going to call the police." This type of audio media file is intended to be played in a loud speaker in a part of the house other than where the break-in occurred. In another aspect, the determination of the audio media file is additionally based on the video or image media included in the media request that shows the intruder. The server 109 may analyze the video or image of the intruder and identify the height, race, or clothing color of the intruder. The server 109 may then, in turn, use this data in determining the media. For example, an audio media file may have content that include a voice saying "white, six foot tall intruder wearing red shirt and blue pants detected." The audio media file may also incorporate the location of the home and the location in the home in which the break-in occurred, such as "white, six foot tall intruder wearing red shirt and blue pants detected in the front living room of 123 Main Street." This audio media file may be played on a loudspeaker device within the home to inform the occupants of the exact nature of the break-in or to scare off the intruder. A loudspeaker device on the outside of the home may play the audio media file in order to notify neighbors of the break-in and the description of the intruder.

At block 208, the determined media may be adapted. The adaptation of the determined media may be based on information included in the request for media, such as event information, device information, or user information. The adaptation may be performed by the server 109.

A determined media may be adapted according to device information included in the request for media. The device information may dictate the file format to which the media must conform. For example, device information may indicate that a destination device 106 is only capable of displaying MPEG format video and, therefore, the server may adapt a determined video media file by converting the video media file into MPEG format.

The device information may also call for a particular quality or range of qualities of a media file, such as certain resolutions for a video or image file or certain bit rates for an audio media file. For example, if device information indicates that a destination device 106 is only capable of displaying low-resolution video (e.g., 640 pixels by 480 pixels), a determined high-resolution video media file may be adapted by converting it to a low resolution.

A determined media file may also be adapted to change the type of media. As an example, if a destination device 106 is only capable of playing audio media files, a determined video media file may be adapted by converting the video media file to an audio media file. As another example, if a destination device 106 is only capable of using text media, a speech-to-text conversion method may be used to convert a determined video or audio media file to a text media file. Conversely, if a destination device 106 is only capable of using audio media, a text-to-speech conversion method may be used to convert a determined text media file to an audio media file.

The device information may also indicate that a destination device 106 may only have a certain amount of storage capacity or is only capable of using a media file within a certain file size range. In this case, a determined media file may be adapted to bring the media file within an acceptable size range for the destination device 106. For example, if device information indicates that a destination device 106 only has 500 MB of storage capacity and a determined video media file is 750 MB in size, the determined video media file may be adapted to be less than 500 MB in size by truncating the video, changing the video media file format, and/or lowering the resolution.

A determined media may also be adapted according to user information included in the request for media. For example, user information may indicate a preference of a user of a destination device 106 for smaller-sized media files in order to reduce bandwidth costs. In this case, a determined media file may be adapted by converting the determined media file to a more compressed format, truncating the contents of the media, and/or reducing the quality (e.g., resolution of a video media file or bit rate of an audio media file) of the media file in order to reduce the size of the media file. As another example, user information may indicate that a user of a destination device 106 does not wish to hear explicit lyrics. If a determined music audio media file contains explicit lyrics, it may be adapted by having the explicit words in the lyrics "bleeped" or edited out.

It should be appreciated that an adaption of media may also be comprised of a selection process from a plurality of available media files. For example, a certain song may be determined as an appropriate media for an event. Three versions may be available in different digital audio formats: one in MPEG-2 Audio Layer III (MP3) format, one in Waveform Audio File (WAV) format, and one in Advanced Audio Coding (AAC) format. The adaptation occurs when one of the three versions is selected from the available choices. In this sense, the determination process of block 206 and the adaptation process of block 208 may occur simultaneously.

The adaptation process is not confined to the server 109, but may also occur on the destination device 106, any intermediate device between the server 109 and the destination device 106, or any other location. For example, a determined media may be a high-resolution video media file and a destination device 106 may be only capable of playing low-resolution video. After the high-resolution video media file is delivered to the destination device 106, the destination device 106 may adapt the high-resolution video media file by converting it to a low-resolution format that the destination device 106 is capable of playing. As another example, a determined media may comprise a media file containing a set of two dimensional X-Y coordinates representing a safe evacuation path from a burning building. The media file may be delivered to a destination device 106 with an augmented reality application. The destination device 106 may adapt the media file containing the set of X-Y coordinates to a format in which the set of X-Y coordinates are represented in the augmented reality application as an overlaid arrow on the augmented reality display, such as described herein.

It should also be understood that the adaption of the determined media may also be informed by other sources of information besides that included in the request for media. The other sources of information may include event information, device information, or user information stored on the server 109 or retrieved from a network resource 112. For example, a server 109 may already have information about a particular user stored thereupon indicating a preference for subtitles in video media. Thus, a determined video media file may be adapted to include subtitles. The event, device, or user information stored on the server 109 or retrieved from a network resource 112 is not limited to information specific to a particular event, device, or user, but may also include a body of information on general sets or classes of events, devices, or users. For example, a server 109 may have a database of information on stereo sound systems or may be connected to such a database on a network resource 112. The database may contain an entry for each stereo sound system on the market, with each entry including, for instance, a model number, a range of bit rates that the stereo sound system model can play, a set of digital audio formats that the stereo sound system model can play, and an amount of storage in the stereo sound system model. In such a case, the device information included in the media request may include only a model number of a stereo sound system destination device 106. The model number may be cross-referenced in the stereo sound system database to determine the capabilities of the stereo sound system destination device 106, which may then be used in the adaptation of the determined media. An analogous process may be used for user and event information. It should be noted that the aforementioned process of retrieving event, device, or user information from a database on a server 109 or network resource 112 may also be employed to determine a media appropriate for an event.

At block 210, instructions are provided to deliver the media to a destination device 106 at a destination location 108. The instructions may be provided by server 109. The instructions to deliver the media may include an identifier of a destination device 106, such as an IP address or a mobile phone number, from device information in the media request, device information stored on the server 109, or device information retrieved from a network resource 112. After the instructions are provided, the media may be delivered to the destination device 106. The media delivery may occur over the Internet 110, an intranet, a local area network (wired or wireless), any other communication medium, or a combination thereof. As an example, after a server 109 has determined and adapted a media, the server 109 may provide instructions to deliver the media to a destination device 106 that is wireless enabled. The media may be transmitted to the destination device 106 over a communication path comprising a connection over the Internet 110 between the server 109 and a cellular base station (not shown) and a wireless connection between the cellular base station and the destination device 106. The media delivery may also include a communication relay over a short-distance communication medium such as infrared or short-range radio (e.g., Bluetooth). For example, a media may be delivered to a communication relay device (not shown), such as a personal computer, at the destination location 108. The communication relay device may then, in turn, transmit the media to the destination device 106 over a Bluetooth connection.

Figure 3:
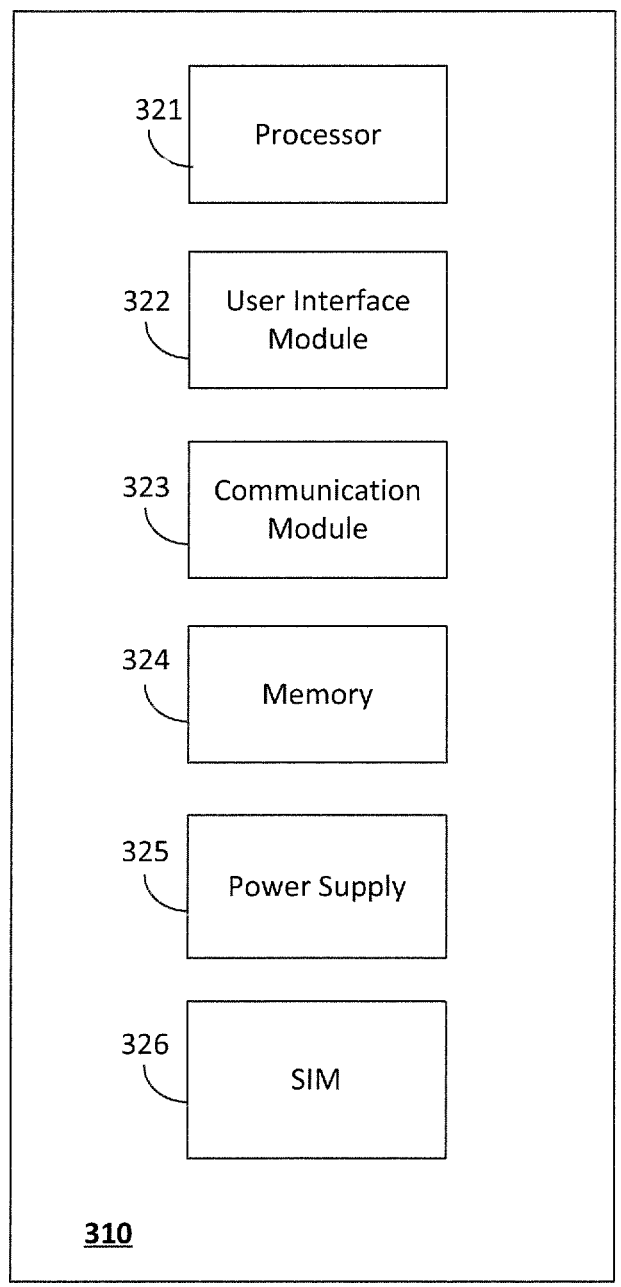
FIG. 3 is a block diagram of a non-limiting exemplary device in which aspects of one or more disclosed examples of machine-to-machine autonomous media delivery may be implemented.

FIG. 3 illustrates an example device 310 that may be used in connection with autonomous media delivery. References will also be made to other figures of the present disclosure as appropriate. For example, detecting device 102, detecting device 104, or destination device 106 may be devices of the type described in regard to FIG. 3, and may have some, all, or none of the components and modules described in regard to FIG. 3. It will be appreciated that the components and modules of device 310 illustrated in FIG. 3 are illustrative, and that any number and type of components and/or modules may be present in device 310. In addition, the functions performed by any or all of the components and modules illustrated in FIG. 3 may be performed by any number of physical components. Thus, it is possible that in some instances the functionality of more than one component and/or module illustrated in FIG. 3 may be performed by any number or types of hardware or a combination of hardware and software.

Processor 321 may be any type of circuitry that performs operations on behalf of device 310. Such circuitry may include circuitry and other components that enable processor 321 to perform any of the functions and methods described herein. Such circuitry and other components may also enable processor 321 to communicate and/or interact with other devices and components, for example any other component of device of device 310, in such a manner as to enable detecting device 102, detecting device 104, destination device 106, server 109 and such other devices and/or components to perform any of the disclosed functions and methods. In one example, processor 321 executes software that may include functionality related to autonomous media delivery, for example. User interface module 322 may be any type or combination of hardware or a combination of hardware and software that enables a user to operate and interact with device 310, and, in one example, to interact with a system or software enabling the user to place, request, and/or receive calls, text communications of any type, voicemail, voicemail notifications, voicemail content and/or data, and/or a system or software enabling the user to view, modify, or delete related software objects. For example, user interface module 322 may include a display, physical and/or "soft" keys, voice recognition software, a microphone, a speaker and the like. Communication module 323 may be any type of network interface including any combination of hardware or a combination of hardware and software that enables device 310 to communicate with any wireline or wireless network equipment. Memory 324 enables device 310 to store information, such as event information, device information, user information, media to be sent with a request for media, and determined media sent from server 109 and to be used by device 310. Memory 324 may take any form, such as internal random access memory (RAM), a hard-disk drive, an optical drive, an SD card, a microSD card and the like. Power supply 325 may be a battery, a direct power source (e.g., an electrical power socket), or other type of power input that is capable of powering device 310. In the event that the device 310 is wireless-enabled, SIM 326 may be any type Subscriber Identity Module and may be configured on a removable or non-removable SIM card that allows device 310 to store data on SIM 326.

Figure 4:
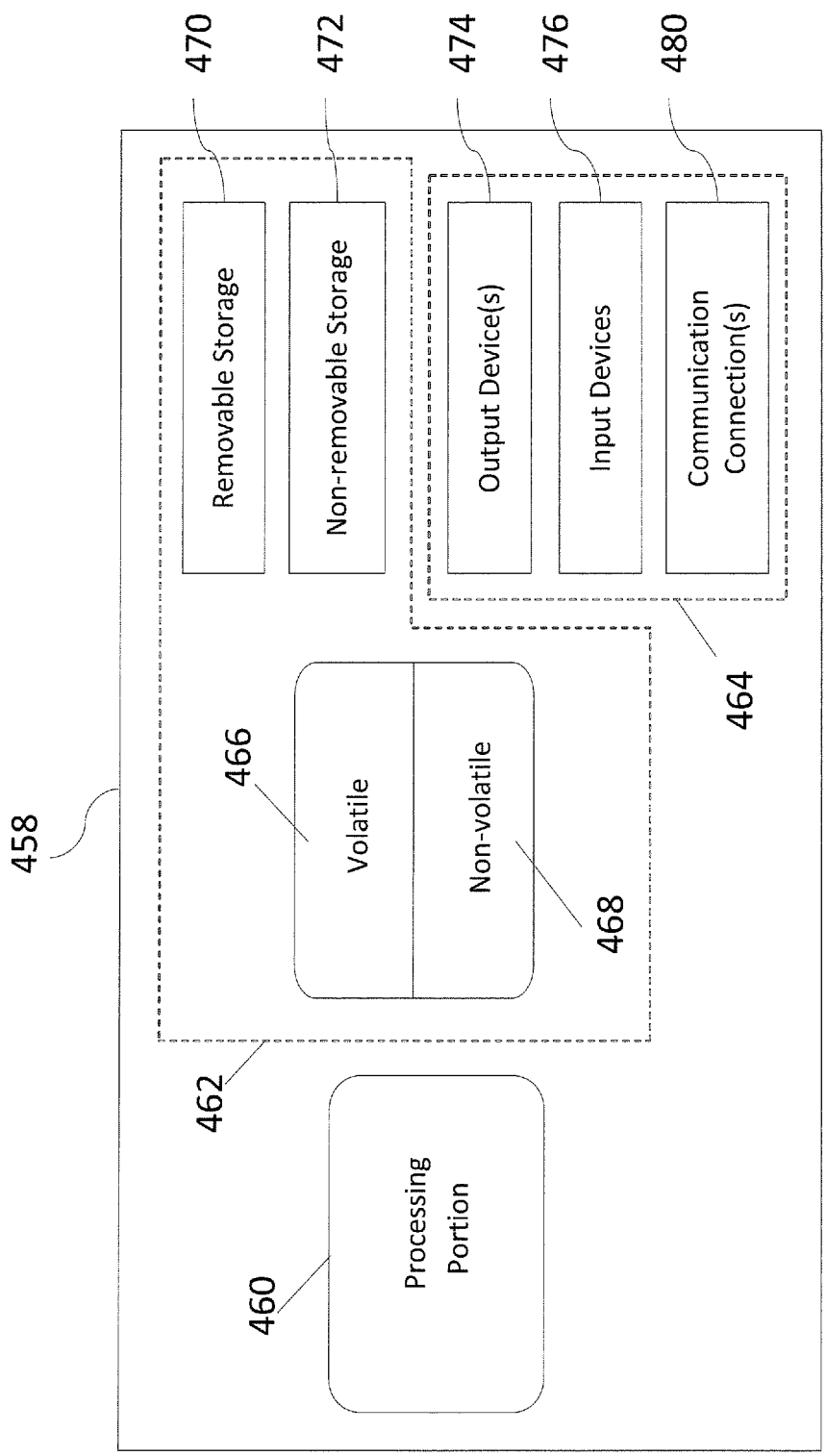
FIG. 4 is a block diagram of a non-limiting exemplary processor in which aspects of one or more disclosed examples of machine-to-machine autonomous media delivery may be implemented.

FIG. 4 is a block diagram of an example processor 458 which machine-to-machine autonomous media delivery may be implemented. Processor 458 may be employed in any of the examples described herein, including as one or more components of a detecting device 102, a detecting device 104, a destination device 106, a server 109, as one or more components of network equipment or any other component of a network encompassed in the Internet 110, and/or as one or more components of any third party system or subsystem that may implement any portion of the subject matter described herein. It is emphasized that the block diagram depicted in FIG. 4 is exemplary and not intended to imply a specific implementation. Thus, the processor 458 may be implemented in a single processor or multiple processors. Multiple processors may be distributed or centrally located. Multiple processors may communicate wirelessly, via hard wire, or a combination thereof. Processor 458 may include circuitry and other components that enable processor 458 to perform any of the functions and methods described herein. Such circuitry and other components may also enable processor 458 to communicate and/or interact with other devices and components, for example any other component of any device disclosed herein or any other device, in such a manner as to enable processor 458 and such other devices and/or components to perform any of the disclosed functions and methods.

As depicted in FIG. 4, the processor 458 comprises a processing portion 460, a memory portion 462, and an input/output portion 464. The processing portion 460, memory portion 462, and input/output portion 464 are coupled together (coupling not shown in FIG. 4) to allow communications between these portions. The input/output portion 464 is capable of providing and/or receiving components, commands, and/or instructions, utilized to, for example, establish and terminate communications sessions, transmit and receive service requests and data access request data and responses, transmit, receive, store and process text, data, and voice communications, execute software that efficiently receives and processes media requests, transmit media, and/or perform any other function described herein.

The processor 458 may be implemented as a client processor and/or a server processor. In a basic configuration, the processor 458 may include at least one processing portion 460 and memory portion 462. The memory portion 462 may store any information utilized in conjunction with establishing, transmitting, receiving, and/or processing text, data, media, and/or voice communications, communications-related data and/or content, voice calls, other telephonic communications, etc. For example, the memory portion is capable of storing media content, such as video media files, audio media files, and text media files. Depending upon the exact configuration and type of processor 458, the memory portion 462 may be volatile (such as RAM) 466, non-volatile (such as ROM, flash memory, etc.) 468, or a combination thereof. The processor 458 may have additional features/functionality. For example, the processor 458 may include additional storage (removable storage 470 and/or non-removable storage 472) including, but not limited to, magnetic or optical disks, tape, flash, smart cards or a combination thereof. Computer storage media, such as memory and storage elements 462, 470, 472, 466, and 468, may include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium that can be used to store the desired information and that can be accessed by the processor 458. Any such computer storage media may be part of the processor 458 and is not a transient signal.

The processor 458 may also contain the communications connection(s) 480 that allow the processor 458 to communicate with other devices, for example through a radio access network (RAN). Communications connection(s) 480 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein includes both storage media and communication media, wherein storage media is not a transient or propagated signal. A computer-readable storage medium, as described herein is an article of manufacture having a concrete, tangible, physical structure, and thus, not to be construed as a propagating signal. Any computer-readable storage medium described herein is not to be construed as a signal. Any computer-readable storage medium described herein is to be construed as an article of manufacture having a concrete, tangible, physical structure. The processor 458 also may have input device(s) 476 such as keyboard, keypad, mouse, pen, voice input device, video input device, touch input device, etc. Output device(s) 474 such as a display, speakers, printer, etc. also may be included.

A RAN as described herein may comprise any telephony radio network, or any other type of communications network, wireline or wireless, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how machine-to-machine autonomous media delivery may be implemented with stationary and non-stationary network structures and architectures in order to do machine-to-machine autonomous media delivery. It can be appreciated, however, that machine-to-machine autonomous media delivery as described herein may be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

The exemplary GSM/GPRS environment and services described herein also may be extended to 3G services, such as Universal Mobile Telephone System (UMTS), Frequency Division Duplexing (FDD) and Time Division Duplexing (TDD), High Speed Packet Data Access (HSPDA), cdma2000 1 Evolution Data Optimized (EVDO), Code Division Multiple Access-2000 (cdma2000 3), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), etc., as well as to other network services that become available in time. In this regard, machine-to-machine autonomous media delivery may be applied independently of the method of data transport and does not depend on any particular network architecture or underlying protocols.

Figure 5:
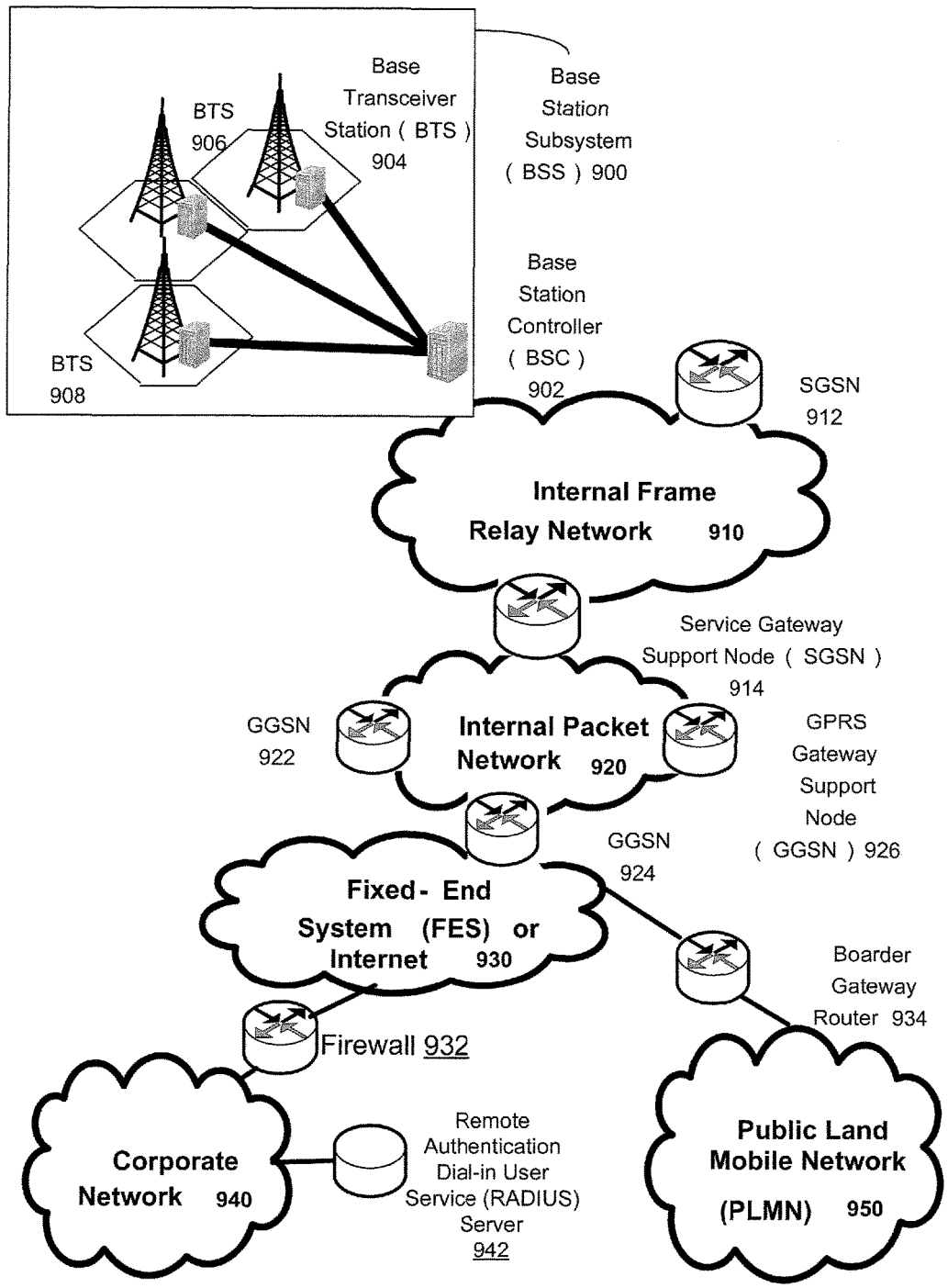
FIG. 5 is a block diagram of a non-limiting exemplary packet-based mobile cellular network environment, such as a GPRS network, in which one or more disclosed examples may be implemented for machine-to-machine autonomous media delivery.

FIG. 5 depicts an overall block diagram of an exemplary packet-based mobile cellular network environment, such as a GPRS network, in which machine-to-machine autonomous media delivery systems and methods such as those described herein may be practiced. In an example configuration, any RAN as described herein may be encompassed by or interact with the network environment depicted in FIG. 5. Similarly, mobile devices, such as detecting device 102, detecting device 104, and destination device 106 may communicate or interact with a network environment such as that depicted in FIG. 5. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., detecting device 102, detecting device 104, and destination device 106) become connected to the wireless network. In exemplary fashion, the packet traffic originating from user devices (e.g., detecting device 102, detecting device 104, and destination device 106) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc. may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932, and PLMN 950 may be connected to GGSN 924 via border gateway router 934. The Remote Authentication Dial-In User Service (RADIUS) server 942 may be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 6:
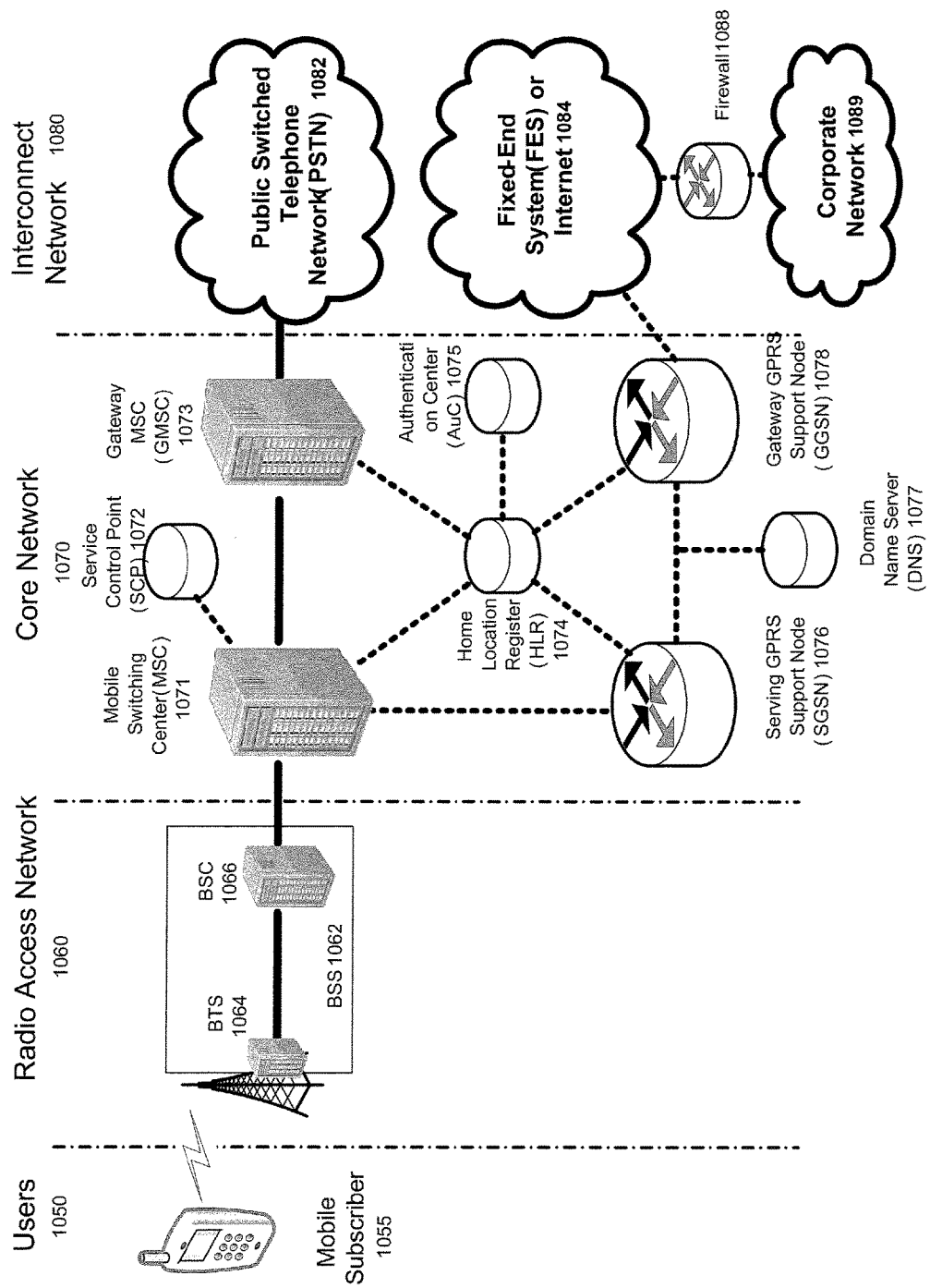
FIG. 6 illustrates a non-limiting exemplary architecture of a typical GPRS network, segmented into four groups, in which one or more disclosed examples may be implemented for machine-to-machine autonomous media delivery.

FIG. 6 illustrates an example architecture of a GPRS network in which one or more disclosed examples of machine-to-machine autonomous media delivery may be implemented. The GPRS network depicted in FIG. 6 comprises four groups: users 1050, radio access network 1060, core network 1070, and interconnect network 1080. Users 1050 may comprise a plurality of end users (though only mobile subscriber 1055 is shown in FIG. 6). In an example, the device depicted as mobile subscriber 1055 may comprise any of detecting device 102, detecting device 104, or destination device 106. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 6, interconnect network 1080 comprises Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076 that may send the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. In some examples, HLR 1074 may be a device such as HSSs. HLR 1074 may store static information about the subscribers such as the International Mobile Subscriber Identity (IMSI), APN profiles as described herein, subscribed services, and a key for authenticating the subscriber. HLR 1074 may also store dynamic subscriber information such as dynamic APN profiles and the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as detecting device 102, detecting device 104, and destination device 106, used by an end user of a mobile cellular service or a wireless provider. When a mobile subscriber turns on his or her mobile device, the mobile device may go through an attach process by which the mobile device attaches to an SGSN of the GPRS network. In FIG. 6, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself to the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076. The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to an Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, which may be provisioned to map to one or more GGSN nodes in the core network 1070. Based on the APN, the mapped GGSN 1078 may access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality of machine-to-machine autonomous media delivery systems and methods such as those described herein may include, but are not limited to, Gateway GPRS Support Node tables, Fixed End System router tables, firewall systems, VPN tunnels, and any number of other network elements as required by the particular digital network.

Figure 7:
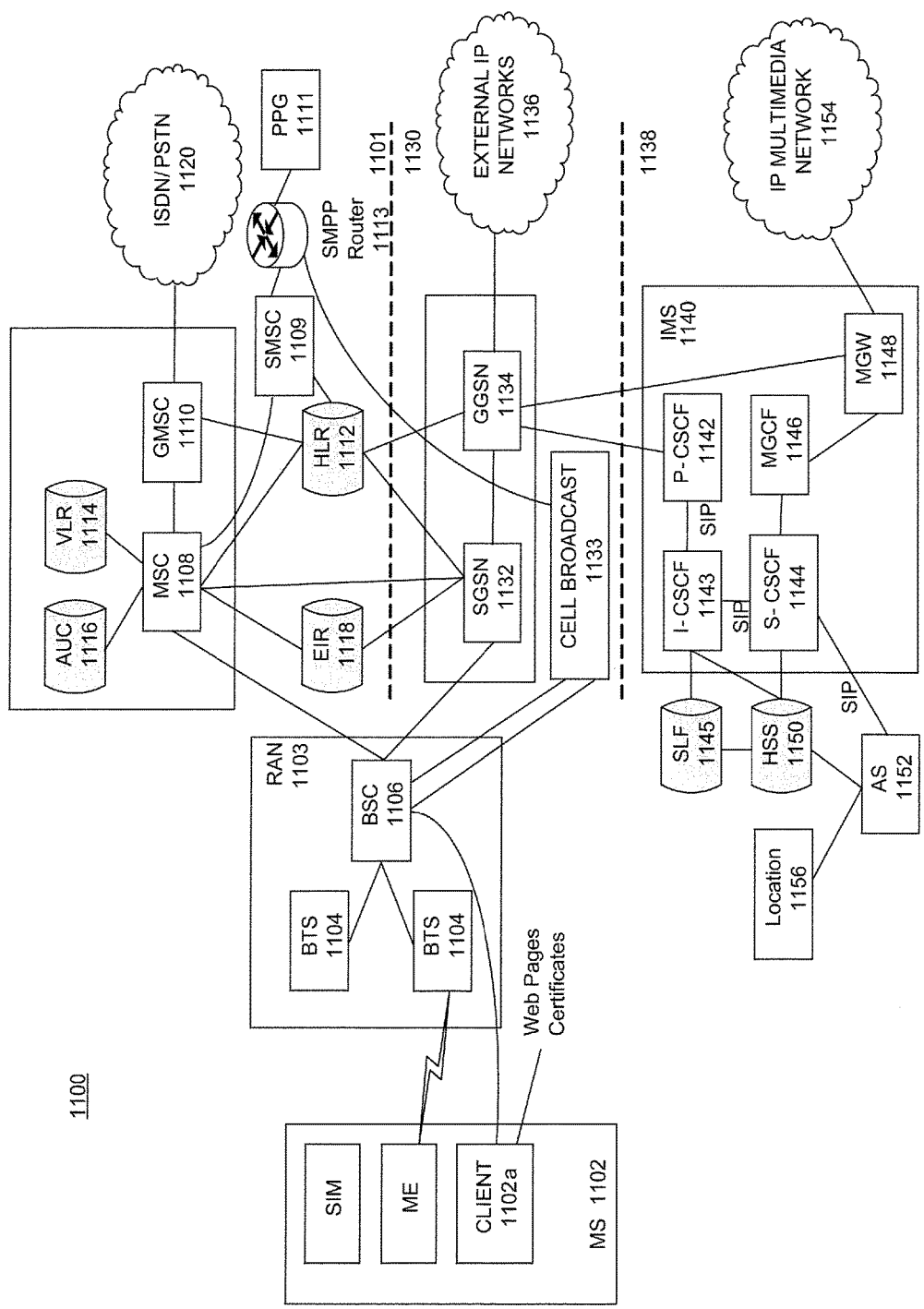
FIG. 7 illustrates a non-limiting alternate block diagram of an exemplary GSM/GPRS/IP multimedia network architecture in which one or more disclosed examples may be implemented for machine-to-machine autonomous media delivery.

FIG. 7 illustrates another exemplary block diagram view of a GSM/GPRS/IP multimedia network architecture 1100 in which the systems and methods for machine-to-machine autonomous media delivery such as those described herein may be incorporated. As illustrated, architecture 1100 of FIG. 7 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., detecting device 102, detecting device 104, or destination device 106) that is used by mobile subscribers, in one example with a Subscriber Identity Module (SIM). The SIM includes an International Mobile Subscriber Identity (IMSI), which is a unique identifier of a subscriber. The SIM may also include APNs. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 may be a database that may contain administrative information regarding each subscriber registered in a corresponding GSM network. Such information may include APNs and APN profiles. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The HLR 1112 and the VLR 1114, together with the MSC 1108, may provide the call routing and roaming capabilities of GSM. The AuC 1116 may provide the parameters needed for authentication and encryption functions. Such parameters allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, short message service (SMS), and multimedia message service (MMS), the MS may first register with the network to indicate its current location by performing a location update and IMSI attach procedure. MS 1102 may send a location update including its current location information to the MSC/VLR, via BTS 1104 and BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

GPRS network 1130 may be designed to operate in three network operation modes (NOM1, NOM2 and NOM3). A network operation mode of a GPRS network may be indicated by a parameter in system information messages transmitted within a cell. The system information messages may direct an MS where to listen for paging messages and how to signal towards the network. The network operation mode represents the capabilities of the GPRS network. In a NOM1 network, a MS may receive pages from a circuit switched domain (voice call) when engaged in a data call. The MS may suspend the data call or take both simultaneously, depending on the ability of the MS. In a NOM2 network, a MS may not receive pages from a circuit switched domain when engaged in a data call, since the MS may be receiving data and may not be listening to a paging channel. In a NOM3 network, a MS may monitor pages for a circuit switched network while receiving data and vice versa.

The IP multimedia network 1138 was introduced with 3GPP Release 5, and may include IP multimedia subsystem (IMS) 1140 to provide rich multimedia services to end users. A representative set of the network entities within IMS 1140 are a call/session control function (CSCF), a media gateway control function (MGCF) 1146, a media gateway (MGW) 1148, and a master subscriber database, called a home subscriber server (HSS) 1150. HSS 1150 may be common to GSM core network 1101, GPRS network 1130 as well as IP multimedia network 1138. HSS 1150 may include multiple HSSs.

IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

I-CSCF 1143 forms an entrance to a home network and hides the inner topology of the home network from other networks and provides flexibility for selecting an S-CSCF. I-CSCF 1143 may contact subscriber location function (SLF) 1145 to determine which HSS 1150 to use for the particular subscriber, if multiple HSSs 1150 are present. S-CSCF 1144 may perform the session control services for MS 1102. This includes routing originating sessions to external networks and routing terminating sessions to visited networks. S-CSCF 1144 may also decide whether an application server (AS) 1152 is required to receive information on an incoming SIP session request to ensure appropriate service handling. This decision may be based on information received from HSS 1150 (or other sources, such as application server 1152). AS 1152 may also communicate to location server 1156 (e.g., a Gateway Mobile Location Center (GMLC)) that provides a position (e.g., latitude/longitude coordinates) of MS 1102.

HSS 1150 may contain a subscriber profile and keep track of which core network node is currently handling the subscriber. It may also support subscriber authentication and authorization functions (AAA). In networks with more than one HSS 1150, a subscriber location function provides information on the HSS 1150 that contains the profile of a given subscriber.

MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCMcoded voice.) MGW 1148 may also communicate with other IP multimedia networks 1154.

Push to Talk over Cellular (PoC) capable mobile telephones may register with the wireless network when the telephones are in a predefined area (e.g., job site, etc.) When the mobile telephones leave the area, they may register with the network in their new location as being outside the predefined area. This registration, however, does not indicate the actual physical location of the mobile telephones outside the pre-defined area.

Figure 8:
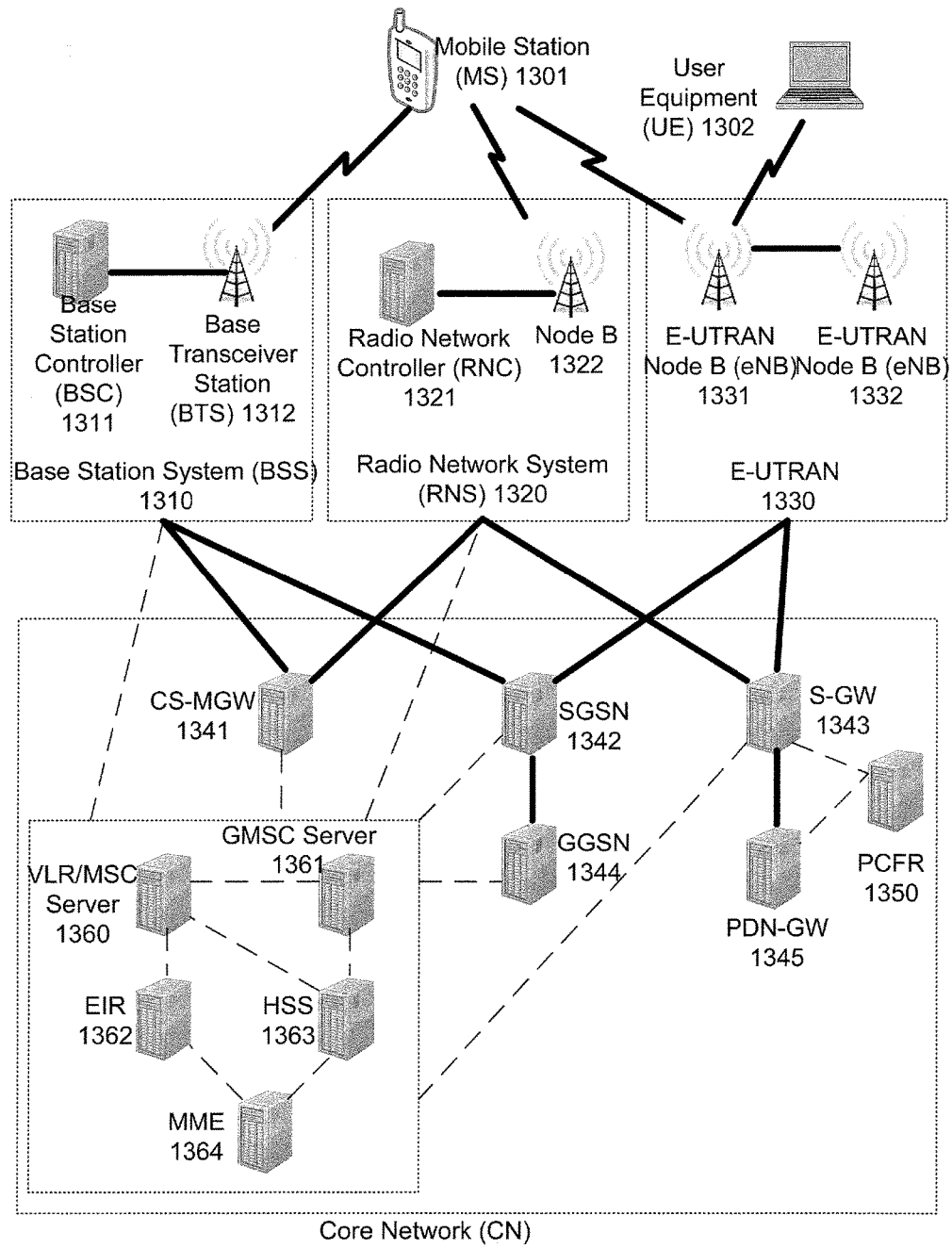
FIG. 8 illustrates a Public Land Mobile Network (PLMN) block diagram view of an exemplary architecture in which one or more disclosed examples may be implemented for machine-to-machine autonomous media delivery.

FIG. 8 illustrates a PLMN block diagram view of an exemplary architecture in which machine-to-machine autonomous media delivery may be incorporated. Mobile Station (MS) 1301 is the physical equipment used by the PLMN subscriber. In one illustrative example, a detecting device 102, a detecting device 104, or a destination device 106 may serve as Mobile Station 1301. Mobile Station 1301 may be one of, but not limited to, a cellular telephone, a cellular telephone in combination with another electronic device or any other wireless mobile communication device.

Mobile Station 1301 may communicate wirelessly with Base Station System (BSS) 1310. BSS 1310 contains a Base Station Controller (BSC) 1311 and a Base Transceiver Station (BTS) 1312. BSS 1310 may include a single BSC 1311/BTS 1312 pair (Base Station) or a system of BSC/BTS pairs which are part of a larger network. BSS 1310 is responsible for communicating with Mobile Station 1301 and may support one or more cells. BSS 1310 is responsible for handling cellular traffic and signaling between Mobile Station 1301 and Core Network 1340. Typically, BSS 1310 performs functions that include, but are not limited to, digital conversion of speech channels, allocation of channels to mobile devices, paging, and transmission/reception of cellular signals.

Additionally, Mobile Station 1301 may communicate wirelessly with Radio Network System (RNS) 1320. RNS 1320 contains a Radio Network Controller (RNC) 1321 and one or more Node(s) B 1322. RNS 1320 may support one or more cells. RNS 1320 may also include one or more RNC 1321/Node B 1322 pairs or alternatively a single RNC 1321 may manage multiple Nodes B 1322. RNS 1320 is responsible for communicating with Mobile Station 1301 in its geographically defined area. RNC 1321 is responsible for controlling the Node(s) B 1322 that are connected to it and is a control element in a UMTS radio access network. RNC 1321 performs functions such as, but not limited to, load control, packet scheduling, handover control, security functions, as well as controlling Mobile Station 1301's access to the Core Network (CN) 1340.

The evolved UMTS Terrestrial Radio Access Network (E-UTRAN) 1330 is a radio access network that provides wireless data communications for Mobile Station 1301 and User Equipment 1302. E-UTRAN 1330 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 1330 may include of series of logical network components such as E-UTRAN Node B (eNB) 1331 and E-UTRAN Node B (eNB) 1332. E-UTRAN 1330 may contain one or more eNBs. User Equipment 1302 may be any user device capable of connecting to E-UTRAN 1330 including, but not limited to, a personal computer, laptop, mobile device, wireless router, or other device capable of wireless connectivity to E-UTRAN 1330. The improved performance of the E-UTRAN 1330 relative to a typical UMTS network allows for increased bandwidth, spectral efficiency, and functionality including, but not limited to, voice, high-speed applications, large data transfer and IPTV, while still allowing for full mobility.

An exemplary mobile data and communication service that may be implemented in the PLMN architecture described in FIG. 8 is the Enhanced Data rates for GSM Evolution (EDGE). EDGE is an enhancement for GPRS networks that implements an improved signal modulation scheme known as 9-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 1301 may communicate with any or all of BSS 1310, RNS 1320, or E-UTRAN 1330. In an illustrative system, each of BSS 1310, RNS 1320, and E-UTRAN 1330 may provide Mobile Station 1301 with access to Core Network 1340. The Core Network 1340 may include of a series of devices that route data and communications between end users. Core Network 1340 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched—Media Gateway Function (CS-MGW) 1341 is part of Core Network 1340, and interacts with Visitor Location Register (VLR) and Mobile-Services Switching Center (MSC) Server 1360 and Gateway MSC Server 1361 in order to facilitate Core Network 1340 resource control in the CS domain. Functions of CS-MGW 1341 include, but are not limited to, media conversion, bearer control, payload processing and other mobile network processing such as handover or anchoring. CS-MGW 1340 may receive connections to Mobile Station 1301 through BSS 1310, RNS 1320 or both.

Serving GPRS Support Node (SGSN) 1342 stores subscriber data regarding Mobile Station 1301 in order to facilitate network functionality. SGSN 1342 may store subscription information such as, but not limited to, the International Mobile Subscriber Identity (IMSI), temporary identities, or Packet Data Protocol (PDP) addresses. SGSN 1342 may also store location information such as, but not limited to, the Gateway GPRS Support Node (GGSN) 1344 address for each GGSN where an active PDP exists. GGSN 1344 may implement a location register function to store subscriber data it receives from SGSN 1342 such as subscription or location information.

Serving Gateway (S-GW) 1343 is an interface which provides connectivity between E-UTRAN 1330 and Core Network 1340. Functions of S-GW 1343 include, but are not limited to, packet routing, packet forwarding, transport level packet processing, event reporting to Policy and Charging Rules Function (PCRF) 1350, and mobility anchoring for inter-network mobility. PCRF 1350 uses information gathered from S-GW 1343, as well as other sources, to make applicable policy and charging decisions related to data flows, network resources and other network administration functions. Packet Data Network Gateway (PDN-GW) 1345 may provide user-to-services connectivity functionality including, but not limited to, network-wide mobility anchoring, bearer session anchoring and control, and IP address allocation for PS domain connections.

Home Subscriber Server (HSS) 1363 is a database for user information, and stores subscription data regarding Mobile Station 1301 or User Equipment 1302 for handling calls or data sessions. Networks may contain one HSS 1363 or more if additional resources are required. Exemplary data stored by HSS 1363 include, but is not limited to, user identification, numbering and addressing information, security information, or location information. HSS 1363 may also provide call or session establishment procedures in both the PS and CS domains.

The VLR/MSC Server 1360 provides user location functionality. When Mobile Station 1301 enters a new network location, it begins a registration procedure. A MSC Server for that location transfers the location information to the VLR for the area. A VLR and MSC Server may be located in the same computing environment, as is shown by VLR/MSC Server 1360, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 1301 registration or procedures for handover of Mobile Station 1301 to a different section of the Core Network 1340. GMSC Server 1361 may serve as a connection to alternate GMSC Servers for other mobile stations in larger networks.

Equipment Identity Register (EIR) 1362 is a logical element which may store the International Mobile Equipment Identities (IMEI) for Mobile Station 1301. In a typical example, user equipment may be classified as either "white listed" or "black listed" depending on its status in the network. In one example, if Mobile Station 1301 is stolen and put to use by an unauthorized user, it may be registered as "black listed" in EIR 1362, preventing its use on the network. Mobility Management Entity (MME) 1364 is a control node which may track Mobile Station 1301 or User Equipment 1302 if the devices are idle. Additional functionality may include the ability of MME 1364 to contact an idle Mobile Station 1301 or User Equipment 1302 if retransmission of a previous session is required.

While autonomous media delivery has been described in connection with the various examples of the various figures, it is to be understood that other similar examples may be used or modifications and additions may be made to the described examples for performing the same function of autonomous media delivery without deviating therefrom. For example, one skilled in the art will recognize autonomous media delivery as described in the present application may apply to any environment, whether wired or wireless, and may be applied to any number of such devices connected via a communications network and interacting across the network. Therefore, autonomous media delivery should not be limited to any single example, but rather should be construed in breadth and scope in accordance with the appended claims.

What is claimed is:

1. An apparatus comprising: a processor; and
a memory coupled to the processor, the memory comprising executable instructions stored thereon that when executed by the processor cause the processor to effectuate operations comprising:
responsive to an autonomous detection of an event by a detection device, receiving a request transmitted by the detection device, the request comprising event information associated with the event, wherein the event is determined, by the detection device, to be a party based on a sound sensor detecting a threshold number of voices and a heat sensor detecting a threshold rise in temperature of a room;
based on the request and memory storage capacity of a destination device, determining a media of a selection of a plurality of types of media appropriate for the event the plurality of types of media comprise audio and video;
responsive to determining the media appropriate for the event, providing instructions to deliver the media appropriate for the event to the destination device.

2. The apparatus of claim 1, wherein the determining the media of the selection of the plurality of types of media appropriate for the event is further based on information comprising a layout of a building.

3. The apparatus of claim 1, wherein the request further comprises user information associated with the destination device.

4. The apparatus of claim 1, wherein the media appropriate for the event comprises data for an augmented reality application.

5. The apparatus of claim 4, wherein the data for the augmented reality application is based on data associated with at least one of a motion detector, a sound sensor, or a heat sensor.

6. A method comprising:
responsive to an autonomous detection of an event by a detection device, receiving a request by a server from the detection device, the request comprising event information associated with the event;
based on the request and memory storage capacity of a destination device, determining a media of a selection of a plurality of types of media appropriate for the event the plurality of types of media comprise audio and video;
responsive to determining the media appropriate for the event, providing, by the server, instructions to deliver the media appropriate for the event to the destination device; and
responsive to detecting of the event, determining, by a detection device using sound sensors and heat sensors, the event is a party based on the sound sensor detecting a threshold number of voices and the heat sensor detecting a threshold rise in the temperature of a room.

7. The method of claim 6, wherein the request further comprises device information associated with destination device.

8. The method of claim 6, wherein the request further comprises user information associated with the destination device.

9. The method of claim 6, wherein the media appropriate for the event comprises data for an augmented reality application.

10. The method of claim 9, wherein the data for the augmented reality application is based on data associated with at least one of a motion detector, a sound sensor, or a heat sensor.

11. A system comprising: a first device;
a detection device; and
a second device communicatively connected with the first device, the second device comprising:
a processor; and
a memory coupled to the processor, the memory having stored thereon executable instructions that when executed by the processor cause the processor to effectuate operations comprising:
responsive to an autonomous detection of an event by the detection device, receiving a request from the detection device, the request comprising event information associated with the event, wherein the event is determined, by the detection device, to be party based on a sound sensor detecting a threshold number of voices and a heat sensor detecting a threshold rise in the temperature of a room;
based on the request and memory storage capacity of the first device, determining a media of a selection of a plurality of types of media appropriate for the event, the plurality of types of media comprise audio and video;
responsive to determining the media appropriate for the event, providing instructions to deliver the media appropriate for the event to the first device.

12. The system of claim 11, wherein the request further comprises device information associated with the first device.

13. The system of claim 11, wherein the request further comprises user information associated with the first device.

14. The system of claim 11, wherein the media appropriate for the event comprises data for an augmented reality application.

* * * * *

UNITED STATES PATENT AND TRADEMARK OFFICE
CERTIFICATE OF CORRECTION

PATENT NO. : 9,843,912 B2
APPLICATION NO. : 14/527979
DATED : December 12, 2017
INVENTOR(S) : Venson Shaw Page 1 of 1

It is certified that error appears in the above-identified patent and that said Letters Patent is hereby corrected as shown below:

In the Claims

Claim 11,
Column 25, Line 19, delete "to be party" and insert -- to be a party --.

Signed and Sealed this
Thirtieth Day of October, 2018

Andrei Iancu
*Director of the United States Patent and Trademark Office*